United States Patent
Li et al.

(10) Patent No.: US 9,917,952 B2
(45) Date of Patent: Mar. 13, 2018

(54) EVALUATION OF PERCEPTUAL DELAY IMPACT ON CONVERSATION IN TELECONFERENCING SYSTEM

(71) Applicant: Dolby Laboratories Licensing Corporation, San Francisco, CA (US)

(72) Inventors: Kai Li, Beijing (CN); Doh-Suk Kim, Cupertino, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/474,823

(22) Filed: Mar. 30, 2017

(65) Prior Publication Data

US 2017/0289357 A1 Oct. 5, 2017

Related U.S. Application Data

(60) Provisional application No. 62/315,881, filed on Mar. 31, 2016.

(30) Foreign Application Priority Data

Mar. 31, 2016 (CN) .......................... 2016 1 0191116

(51) Int. Cl.
*H04M 3/56* (2006.01)
*H04M 3/22* (2006.01)
(Continued)

(52) U.S. Cl.
CPC .............. *H04M 3/568* (2013.01); *G10L 25/48* (2013.01); *G10L 25/87* (2013.01); *H04M 3/2236* (2013.01)

(58) Field of Classification Search
CPC ......................... H04M 3/568; H04M 3/2236
See application file for complete search history.

(56) References Cited

U.S. PATENT DOCUMENTS 5,285,498 A * 2/1994 Johnston ............... H04H 20/88
381/2
6,704,451 B1 3/2004 Hekstra
(Continued)

FOREIGN PATENT DOCUMENTS

WO 2008/119929 10/2008
WO 2015/105764 7/2015

OTHER PUBLICATIONS

ITU-T Rec. G.107, The E-Model, a Computational Model for Use in Transmission Planning, International Telecommunication Union, CH—Geneva, 2009.
(Continued)

*Primary Examiner* — Nafiz E Hoque

(57) ABSTRACT

Example embodiments disclosed herein relate to an evaluation of perceptual delay impact on a conversation. A method of evaluating perceptual delay impact on a conversation is disclosed. The method includes detecting a conversational event between a first participant and a second participant, the conversational event including a plurality of speech segments; in response to the conversational event being detected, obtaining at least one conversational parameter for the first and second participants, the at least one conversational parameter indicating a relationship between the plurality of speech segments in the conversational event; and determining a quality of the conversation according to a model based on the at least one conversational parameter, the model characterizing the quality with the at least one conversational parameter. A method of obtaining a model for evaluating perceptual delay impact on a conversation is also disclosed. Corresponding systems and computer program products are also disclosed.

15 Claims, 7 Drawing Sheets

(51) Int. Cl.
*G10L 25/48* (2013.01)
*G10L 25/87* (2013.01)

(56) References Cited

U.S. PATENT DOCUMENTS

| | | | |
|---|---|---|---|
| 7,295,549 B2 | 11/2007 | Pepin | |
| 7,792,281 B1 * | 9/2010 | Zad-Issa | H04M 9/082 379/406.04 |
| 7,796,524 B1 | 9/2010 | O'Connell | |
| 7,856,355 B2 | 12/2010 | Kim | |
| 7,869,377 B2 | 1/2011 | Clark | |
| 8,184,537 B1 | 5/2012 | Gopal | |
| 8,520,075 B2 | 8/2013 | Bhagavathy | |
| 9,118,751 B2 | 8/2015 | Kolbegger | |
| 2006/0245364 A1 | 11/2006 | Zhu | |
| 2009/0238371 A1 | 9/2009 | Rumsey | |
| 2011/0288865 A1 | 11/2011 | Chan | |
| 2014/0358526 A1 | 12/2014 | Abdelal | |
| 2015/0073780 A1 | 3/2015 | Sharma | |
| 2015/0142146 A1 | 5/2015 | Dunne | |
| 2015/0149540 A1 | 5/2015 | Barker | |
| 2015/0149929 A1 | 5/2015 | Shepherd | |
| 2015/0154291 A1 | 6/2015 | Shepherd | |
| 2015/0156324 A1 | 6/2015 | Assem | |
| 2015/0169069 A1 | 6/2015 | Lo | |
| 2015/0172202 A1 | 6/2015 | Zealey | |
| 2015/0179186 A1 | 6/2015 | Swierk | |
| 2015/0199979 A1 | 7/2015 | Hines | |

OTHER PUBLICATIONS

Kitawaki, N. et al "Pure Delay Effects on Speech Quality in Telecommunications" IEEE J. on Selected Areas in Communications, vol. 9, No. 4, pp. 586-593, May 1991.

Sun, L. et al "Voice Quality Prediction Models and Their Application in VoIP Networks" IEEE Transactions on Multimedia, vol. 8, No. 4, Aug. 2006, pp. 809-820.

Calyam, P. et al "A "Gap-Model" Based Framework for Online VVoIP QoE Measurement" Communications and letworks, vol. 9, No. 4, pp. 446-456, Dec. 2007.

Carvalho, L. et al "An E-Model Implementation for Speech Quality Evaluation in VoIP Systems" Symp. on computers and Comm. (ISCC), pp. 933-938, Jun. 2005.

Sat, Batu "Design and Evaluation of Real-Time Voice-Over-IP (VOIP) Systems with High Perceptual Conversational Quality" Ph.D. Dissertation, University of Illinois, pp. 1-167, Aug. 2010.

Gueguin, M. et al "On the Evaluation of the Conversational Speech Quality in Telecommunications" EURASIP Journal on Advances in Signal Processing, No. 93, pp. 1-32, Jan. 2008.

Ding, L. et al "Speech Quality Prediction in VoIP Using the Extended E-Model" Global Telecommunications Conference, vol. 7, pp. 3974-3978, Dec. 2003.

Schoenenberg, K. et al "Why are you so slow?-Misattribution of Transmission Delay to Attributes of the Conversation Partner at the Far-End" Article in International Journal of Human-Computer Studies, vol. 72, No. 5, pp. 477-487, Mar. 2014.

* cited by examiner

EVALUATION OF PERCEPTUAL DELAY IMPACT ON CONVERSATION IN TELECONFERENCING SYSTEM

TECHNOLOGY

Example embodiments disclosed herein generally relate to evaluation of perceptual delay impact on a conversation, and more specifically, to methods and systems for evaluating perceptual delay impact on a conversation and for obtaining a model to evaluate perceptual delay impact on a conversation.

BACKGROUND

In audio communication scenarios such as telecommunication or video conference, and the like, participants may experience unwanted delay of a conversation. The delay may be caused by a lot of reasons, such as a physical distance between the participants, devices for data transmission, and the like. A telecommunications service provider may therefore wish to monitor the delay and record data relating to the delay in a log.

At present, the service providers measure absolute delay values over time. However, in some situations delay may be very harmful to user experiences, for example, when the participants are in an intense discussion or debate, because the delayed messages inevitably degrade a quality of the conversation. In some other situations, however, delay may be less harmful, for example, when one of the participants is mainly speaking and other participants are mainly listening. In conventional delay evaluation approaches, the measured delay values are usually unable to reflect an actual quality of conversation perceived by users.

SUMMARY

Example embodiments disclosed herein proposes a method and system for evaluating perceptual delay impact on a conversation, and a method and system for obtaining a model for evaluating perceptual delay impact on a conversation.

In one aspect, example embodiments disclosed herein provide a method of evaluating perceptual delay impact on a teleconferencing conversation. The method includes detecting a conversational event between a first participant and a second participant, the conversational event including a plurality of speech segments, in response to the conversational event being detected, obtaining at least one conversational parameter for the first and second participants, the at least one conversational parameter indicating a relationship between the plurality of speech segments in the conversational event, and determining a quality of the conversation or a quality of degradation of conversation due to delay according to a model based on the at least one conversational parameter, the model characterizing the quality with the at least one conversational parameter.

In another aspect, example embodiments disclosed herein provide a system for evaluating perceptual delay impact on a conversation. The system includes an event detector configured to detect a conversational event between a first participant and a second participant, the conversational event including a plurality of speech segments, a parameter obtainer configured to obtain, in response to the conversational event being detected, at least one conversational parameter for the first and second participants, the at least one conversational parameter indicating a relationship between the plurality of speech segments in the conversational event, and a quality determiner configured to determine a quality of the conversation according to a model based on the at least one conversational parameter, the model characterizing the quality with the at least one conversational parameter.

In a further aspect, example embodiments disclosed herein provide a method of obtaining a model for evaluating perceptual delay impact on a teleconferencing conversation based on at least one conversational parameter. The at least one conversational parameter indicates a relationship between a plurality of speech segments in a conversational event of the conversation. The method includes selecting a parametric function as the model, the parametric function being defined by the at least one conversational parameter and a coefficient as inputs, and a quality value as an output, receiving the at least one conversational parameter of a first conversation, receiving a first reference value indicating a user's degree of satisfaction on the delay of the first conversation, and determining the coefficient by reducing a difference between the quality value and the first input below a threshold difference.

In a further aspect, example embodiments disclosed herein provide a system for obtaining a model for evaluating perceptual delay impact on a teleconferencing conversation based on at least one conversational parameter. The system includes a parametric function selector configured to select a parametric function as the model, the parametric function being defined by the at least one conversational parameter and a coefficient as inputs, and a quality value as an output, a parameter receiver configured to receiving a first conversational parameter of a first conversation, a reference receiver configured to receive a first reference value indicating a user's degree of satisfaction on the delay of the first conversation, and a coefficient determiner configured to determine the coefficient by reducing a difference between the quality value and the first input below a threshold difference.

Through the following description, it would be appreciated that perceptual delay impact on a teleconferencing conversation can be evaluated more precisely. By using the methods and systems in accordance with the example embodiments disclosed herein, a determined quality can precisely reflect an actual annoying degree of delay of a conversation perceived by human beings. As such, the determined quality is more useful to quality of experience (QoE) monitoring of telecommunications service providers.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DESCRIPTION OF EXAMPLE EMBODIMENTS

Figure 1:
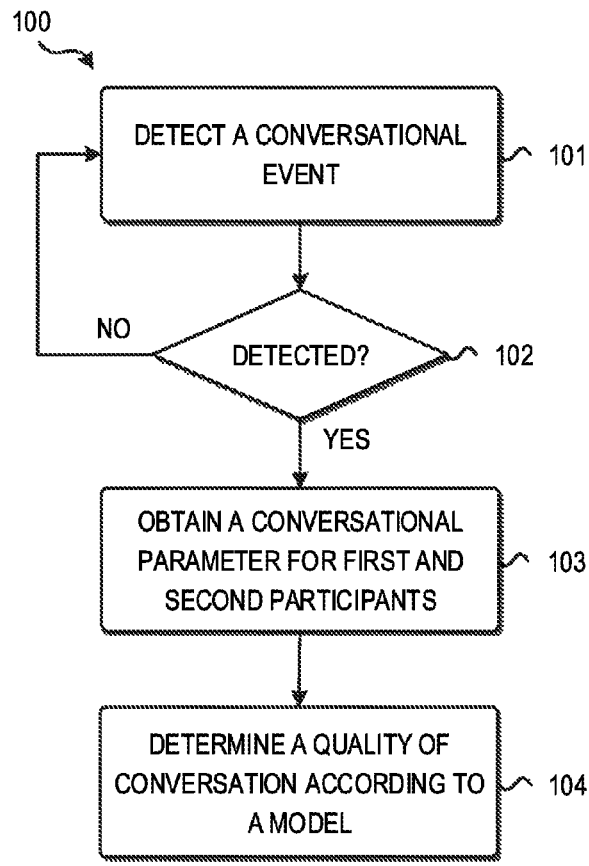
FIG. 1 illustrates a flowchart of a method of evaluating perceptual delay impact on a conversation in accordance with an example embodiment.

Principles of the example embodiments disclosed herein will now be described with reference to various example embodiments illustrated in the drawings. It should be appreciated that the depiction of these embodiments is only to enable those skilled in the art to better understand and further implement the example embodiments disclosed herein, not intended for limiting the scope in any manner.

In a telecommunication or video conference environment, especially using voice over internet protocol (VoIP) services, measurement and management of conversational quality has become more and more important. Such a conversation over the telecommunication has a delayed effect which degrades user experience. It is always desired to obtain more precise measurements of perceptual delay impact on the conversation.

When two participants speak back and forth, some patterns of conversation may exist. For example, for a presentation given by a first participant, the first participant may talk for a long period of time, followed by a few words or sentences responded by a second participant. In response, the first participant may give another speech. In such a conversation pattern, the conversation is dominant by one of the participants, and thus an impact of the delay may be less significant and less noticeable because there is less interaction. Things would be different for a discussion between the first and second participants, in which there may be a plurality of interactions between the participants and a participant usually gives a relatively short speech each time. Delay in such conversation may be annoying and disturbing, negatively affecting the experience of the conversation. That is, the same delay in different kinds of conversations may have different impacts on user's perception and experience.

In order to address this and potential other problems, embodiments describes herein detect and utilize patterns of conversations to obtain "perceptual delay impact" which is a measurement closer to the users' true feelings. In other words, the perceptual delay impact in accordance with the embodiments herein describes an impact close to user's perception and experience on delay. FIG. 1 illustrates a flowchart of a method 100 of evaluating perceptual delay impact on a conversation in accordance with an example embodiment. The method 100 can be used for processing an ongoing conversation or a conversation file recorded previously. In other words, the method 100 according to the present disclosure may be used to conduct an online evaluation or an offline evaluation, and the conversation can be referred to as a conversation in real time or a conversation already recorded. The conversation normally involves at least two participants who communicate with each other via a network. It would be appreciated that embodiments described herein are applicable to conversations involving more than two participants as well.

In step 101, a conversational event between a first participant and a second participant involved in the conversation is detected. In the context of the present disclosure, the "conversational event" refers to a portion of the conversation that includes a plurality of speech segments from at least two participants. A single speech segment or a number of speech segments from only one participant within a period of time may not be regarded as a conversational event. In the context of the present disclosure, the "speech segment" refers to a continuous speech from one of the participants, meaning that one participant keeps talking for a period of time, and the contents during that period of time is called a speech segment. Two speeches from a single participant with an interval there between longer than a predefined length, for example two seconds, may not be regarded as a single speech segment but two separate speech segments.

In step 102, if it is determined that no conversational event is detected, the method 100 returns to the step 101 to continue detecting or monitoring the conversation. Otherwise, in case that at least one conversational event has been detected, the method 100 proceeds to step 103 where a conversational parameter(s) for the first and second participants is obtained. The conversational parameter indicates a relationship between the speech segments in the conversational events. The conversational parameter can be used to describe one of a number of properties of the conversational event and the speech segments. In some embodiments, it is possible to obtain a plurality of conversational parameters for better fidelity of a rebuilt conversational event.

In step 104, a quality of the conversation is determined according to a model based on the conversational parameter obtained in the step 103. The model characterizes the quality with the conversational parameter. The model can be trained in advance to precisely determine the quality of the conversation, which will be discussed in detail later. The model may use the conversational parameter as the input, carry out an operation to the conversational parameter, and result in an output indicating the quality of the conversation, for example, in a form of a quality index ranging from an integer "1" to "5," where the integer "1" means the quality of the conversation is the poorest and the integer "5" means the quality of the conversation is the best. It is to be understood that the above examples are only for illustration and any other suitable forms can be used to reflect the quality. For example, a number of colors can be used to reflect the quality of the conversation, where a color "green" means the quality is good, a color "amber" means the quality is problematic but not severe, and a color "red" means the quality is bad and should be alarmed.

In some example embodiments, the conversational parameter can be obtained over a time interval in the conversation. In such a predefined time interval, there may be more than one conversational event and the conversational parameter may be obtained for all of the conversational events in that interval. Alternatively, the conversational parameter can be obtained for a predefined number of the conversational events.

Figure 2:
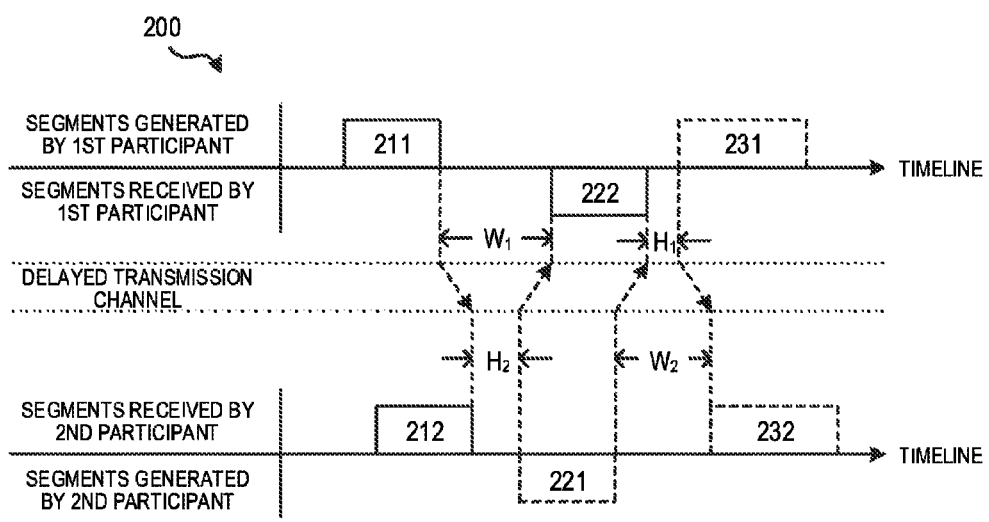
FIG. 2 illustrates a graph showing a conversational event of a non-collision type occurred between two participants in accordance with an example embodiment.

FIGS. 2 to 5 are schematic diagrams illustrating different conversational events occurred between two participants in accordance with example embodiments described herein. As shown in FIG. 2, a conversational event 200 is illustrated with a horizontal axis as a timeline. The upper graph is used to describe the conversational event 200 from perspective of a first participant, and the lower graph is used to describe the conversational event 200 from perspective of a second participant. There is a band between the upper graph and the lower graph, indicating a delayed transmission channel causing delayed signals transmitted between the first and second participants.

A first generated speech segment 211 is pronounced by the first participant, and it lasts for an interval shown as a width of the first speech segment 211. As the first generated speech segment 211 is received by the second participant via the transmission channel, it is turned into a first received speech segment 212 having a delayed offset compared with the first generated speech segment 211. The first generated speech segment 211 and the first received speech segment 212 have the same contents and lengths. The first received speech segment 212 may be somewhat distorted or inserted with noises compared with the first generated speech segment 211, by the transmission channel for example. However, the contents of the first generated speech segment 211 and the first received speech segment 212 may be regarded as the same because they refer to a same speech from the first participant.

Then, after the first received speech segment 212 ends, the second participant waits for a first response interval $H_1$ to produce a second generated speech segment 221. A second received speech segment 222 is similarly rendered to the processes described above with reference to the first generated speech segment 211 and the first received speech segment 212. In short, the second received speech segment 222 is delayed compared with the second generated speech segment 221. Therefore, a first waiting interval $W_1$ exists between an end of the first generated speech segment 211 and a start of the second received speech segment 222.

Later, after the second received speech segment 222 ends, the first participant waits for a second response interval $H_2$ to produce a third generated speech segment 231. A third received speech segment 232 is similarly rendered to the processes described above with reference to the first generated speech segment 211 and the first received speech segment 212. The third received speech segment 232 is delayed compared with the third generated speech segment 231. Therefore, a second waiting interval $W_2$ exists between an end of the second generated speech segment 221 and a start of the third received speech segment 232.

It can be observed that the upper and lower conversational event viewed respectively by the first and second participants are different, due to the delayed transmission. From perspective of the first participant, the first generated speech segment 211, the first waiting interval $W_1$, the second received speech segment 222, the second response interval $H_2$, and the third generated speech segment 231 form altogether a conversational event, or a part of a common conversational event 200. Similarly, the first received speech segment 212, the first response interval $H_1$, the second generated speech segment 221, the second waiting interval $W_2$, and the third received speech segment 232 form altogether another conversational event, or another part of the common conversational event 200.

Although FIG. 2 shows a conversational event including six speech segments, it is to be understood that the above examples are only for illustration and other suitable number of speech segments can be considered to form a conversational event. In this example embodiment shown in FIG. 2, none of the six speech segments is overlapped with another speech segment as viewed from either the first participant or the second participant. In other words, adjacent speech segments of the speech segments are separated from one another, thereby the type of the conversational event 200 shown in FIG. 2 can be referred to as a non-collision type.

Figure 3:
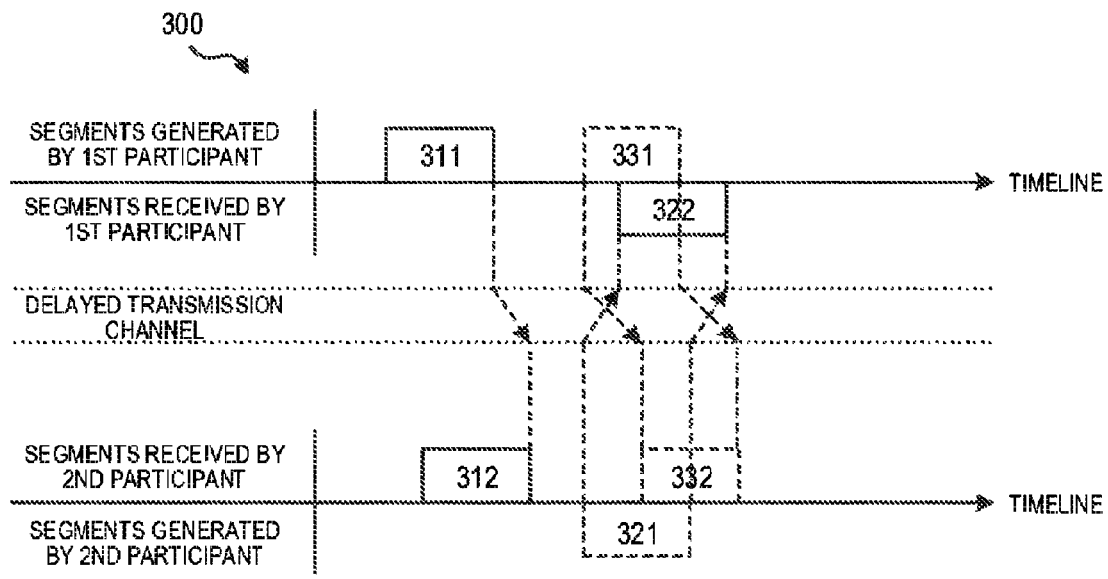
FIG. 3 illustrates a graph showing a conversational event of an unintended collision type and also of a successful interrupt type from perspective of the first participant in accordance with an example embodiment.

FIG. 3 shows a conversational event 300. In this example, a first generated speech segment 311, a first received speech segment 312, a second generated speech segment 321, and a second received speech segment 322 correspond to the first generated speech segment 211, the first received speech segment 212, the second generated speech segment 221, and the second received speech segment 222 as shown in FIG. 2, respectively. A third generated speech segment 331 is prior to the second received speech segment 322, causing a collision of the speech segments. As long as a speech segment from the first participant is at least partially overlapped with another speech segment from the second participant, the conversational event is of a collision type.

The collision shown in FIG. 3 may happen, for example, in the case that the first participant, after finishing the first generated speech segment 311, thinks the first waiting interval is longer than expected. As such, the first participant would naturally guess that the second participant has not received her/his first speech segment, and then produce the third generated speech segment 331. However, the second participant does receive the first speech segment as the first received speech segment 312. Due to the delay caused by the transmission, the second speech segment received by the first participant as the second received speech segment 322 is after the third generated speech segment 331. This collision can be regarded as an unintended collision, because when the first participant produces the third generated speech segment 331, she/he has not yet heard the second speech segment from the second participant. Therefore, the conversational event 300 shown in FIG. 3 is of a collision type, and more specifically, an unintended collision type.

Figure 4:
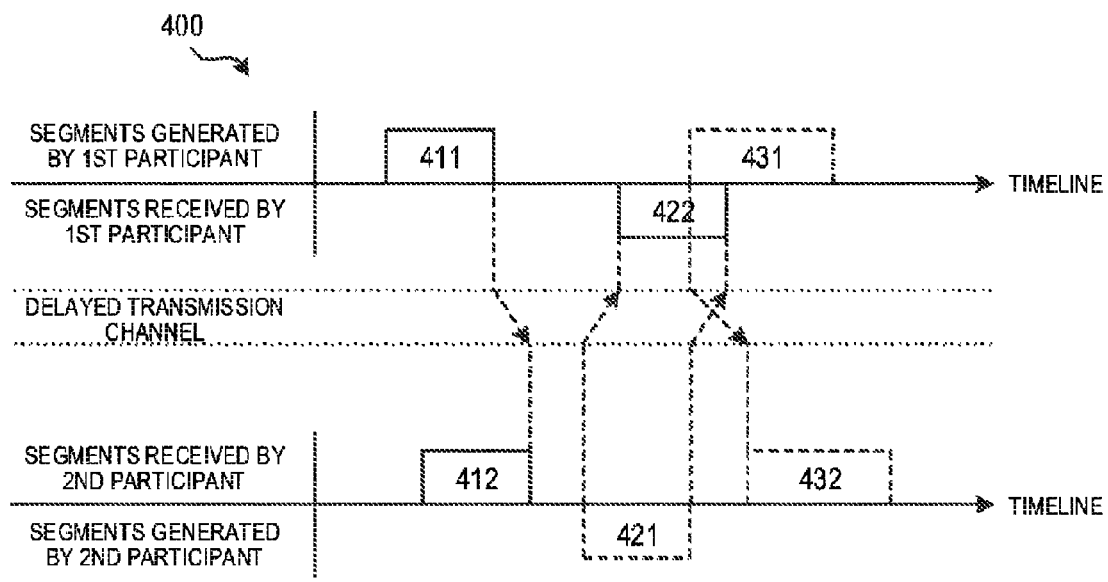
FIG. 4 illustrates a graph showing a conversational event of an intended collision type from perspective of the first participant in accordance with an example embodiment.

FIG. 4 shows a conversational event 400. A first generated speech segment 411, a first received speech segment 412, a second generated speech segment 421, and a second received speech segment 422 correspond to the first generated speech segment 311, the first received speech segment 312, the second generated speech segment 321, and the second received speech segment 322 with reference to as shown in FIG. 3, respectively. A third generated speech segment 431 is after the second received speech segment 422, causing a collision of the speech segments. Therefore, the conversational event 400 is also of a collision type.

The collision shown in FIG. 4 may happen, for example, in the case that the first participant, after hearing the second speech segment from the second participant, intentionally make such a collision by starting the third generated speech segment 431 before the second received speech segment 422 ends. This collision can be regarded as an intended collision, because when the first participant produces the third generated speech segment 331, she/he has already heard the second speech segment from the second participant. Therefore, the conversational event 400 shown in FIG. 4 is of a collision type, and more specifically, an intended collision type.

Figure 5:
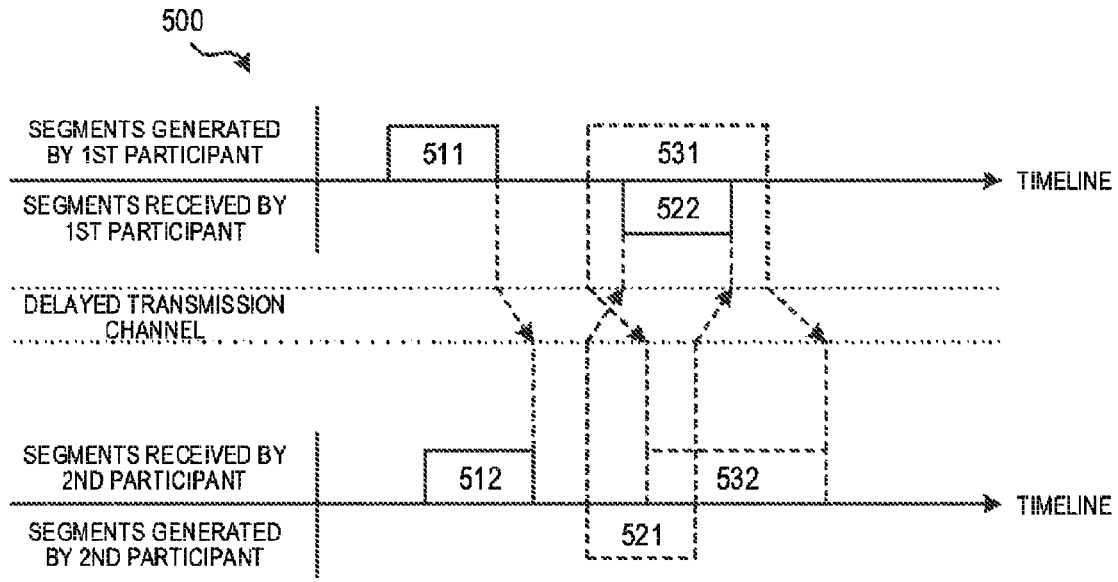
FIG. 5 illustrates a graph showing a conversational event of an unsuccessful interrupt type from perspective of the first participant in accordance with an example embodiment.

FIG. 5 shows a conversational event 500, where a first generated speech segment 511, a first received speech segment 512, a second generated speech segment 521, and a second received speech segment 522 correspond to the first generated speech segment 311, the first received speech segment 312, the second generated speech segment 321, and the second received speech segment 322 shown in FIG. 3, respectively. A third generated speech segment 531 is also prior to the second received speech segment 522, causing a collision of the speech segments. Therefore, the conversational event 400 is also of a collision type. However, an end of the third generated speech segment 531 is after an end of the second received speech segment 522.

The collision shown in FIG. 5 may happen, for example, in a scenario similar to that described above with reference to FIG. 3. However, the first participant does not stop talking even she/he has heard the second received speech segment 522. This collision can be regarded as an unsuccessful interrupt, because the first participant does not stop talking. Therefore, the conversational event 500 shown in FIG. 5 is of an unsuccessful interrupt type. It should be understood that the conversational event may still be counted as an unsuccessful interrupt type even when the third generated speech segment 531 ends, unlike the one shown in FIG. 5, prior to the end of the second received speech segment 522. As long as the first participant keeps talking after a predefined period of time (for example, two seconds) from the start of the second received speech segment 522, the conversational event may be regarded as the unsuccessful interrupt type. On the other hand, if the end of the third generated speech segment 531 is after and distanced from the start of the second received speech segment 522 by an interval within a predefined threshold, the conversational event may then be considered as a successful interrupt type, which can be shown in FIG. 3, because the first participant stops talking upon hearing the speech segment from the second participant.

In some embodiments, a tandem type of the conversational event can be defined by an unintended collision of the speeches following a long waiting interval. For example, by referring to FIG. 3, if an interval between the end of the first generated speech segment 311 and the start of the third generated speech segment 331 exceeds a predetermined threshold, the conversational event can be regarded as of the tandem type. Other types of the event can be defined by combining different conditions such as a long waiting interval followed by an unsuccessful interrupt.

In some embodiments, metadata may be assigned to each conversational event to indicate basic properties of the conversational event. The metadata can be used to rebuild the conversational event. As an example, the metadata may include identities of the participants. Alternatively, or in addition, the metadata may indicate one or more of the following: a start time and an end time of the conversational event; a waiting interval defined by a time interval between an end of an generated speech segment and a start of a received speech segment for a same participant, for example, the waiting intervals $W_1$ and $W_2$ as shown in FIG. 2; a response interval defined by a time interval between an end of a received speech segment and a start of an generated speech segment for a same participant, for example, the response intervals $H_1$ and $H_2$ as shown in FIG. 2; a total length of the speech segments in a conversational event for each of the participants; a ratio of the response interval over the waiting interval; an indicator representing whether a conversational event is of the unintended collision type or the intended collision type; or an indicator representing whether a conversational event is of the successful interrupt type or the unsuccessful interrupt type.

By means of the metadata, one or more long-wait time based conversational parameters (referred to as "long-wait parameters") can be obtained. These long-wait parameters describe a conversational event of the non-collision type or long-wait type. As an example, a long-wait parameter is a total time length of the waiting intervals of a conversational event of the non-collision type within a predefined time interval. A conversational event may be seen as the non-collision type if a ratio of the response interval to the corresponding waiting interval (for example, $H_1/W_1$ or $H_2/W_2$, as shown in FIG. 2) is between 0 and 1 (if the ratio is larger than 1 or smaller than 0, it is indicated that the collision may occur). For example, the first long-wait parameter can be understood as an average of the waiting intervals of all the conversational events of the non-collision type.

In some embodiments, a number of the conversational events of the non-collision type within the predefined time interval may function as a long-wait parameter, where each of the waiting intervals in a conversational event is longer than a threshold length. Such a long-wait parameter reflects the mean occurrence rate of the conversational event of the non-collision type in a given time unit. Another long-wait parameter may be the number of waiting impacts within the predefined time interval. A waiting impact means that a conversational event is negatively affected mainly because of long waiting intervals. For example, in some embodiments, the waiting impact may be counted if the following conditions are fulfilled: the waiting interval is longer than a threshold length, the ratio of the response interval to the waiting interval is in a predefined range, and the speech segments are longer than their corresponding threshold values. The waiting impact can be counted based on other criteria as well.

Alternatively, or in addition, examples of the long-wait parameters include, but are not limited to, a total time length of the waiting intervals within the predefined time interval; a median of the waiting intervals within the predefined time interval; percentiles of the waiting intervals within the predefined time interval; a total number of the waiting impacts within the predefined time interval.

Likewise, one or more collision based parameters (referred to as "collision parameters") can be obtained from the metadata. All the collision based parameters or collision parameters are used to describe a conversational event of the collision type and related to a temporal relationship between the speech segments that are partially overlapped. A mean occurrence rate of conversational events of the unintended collision type occurred at least a threshold time after a conversational event of the non-collision type in a given time unit can function as a collision parameter. Another collision parameter may be a mean occurrence rate of conversational events of the intended collision type in a given time unit.

A further collision parameter may be a number of collision impacts within the predefined time interval. A collision impact means that a conversational event is negatively affected mainly because of collisions of the speech segments. For example, the collision impact may be counted if the following conditions are fulfilled: the conversational event is of the unintended collision type, the waiting intervals are longer than a threshold length, and a ratio of a total length of the speech segments from one participant to a total length of the speech segments from another participant is in a predefined range. The collision impact can be counted based on other criteria as well. A further example of the collision parameters may be a total number of the collision impacts within the predefined time interval.

Alternatively, or in addition, examples of the collision parameters include, but not limited to: a mean occurrence rate of conversational events of the successful interrupt type in a given time unit; a mean occurrence rate of conversational events of the unsuccessful interrupt type in a given time unit; and a ratio of a total length of conversational events of the unintended collision type to the overall conversation length.

In some other embodiment, a collision parameter may be a number of tandem events within the predefined time interval. The tandem event can be counted if a long waiting interval exceeding a predetermined threshold, for example 1600 ms, is followed by an unintended collision of the speeches, as discussed previously.

In some example embodiment, the model to determine the quality of a conversation (denoted as "$Q_{obj}$") from perspective of a user k can be expressed as a linear function. A weighted sum of a number N of the long-wait parameters and the collision parameters $X_1$ to $X_N$ may be calculated, each of the parameters being assigned with a corresponding coefficient $\beta_1$ to $\beta_N$. Then, the weighted sum is offset by a constant $\alpha$. In this way, the model can be expressed as follows:

$$Q_{obj}^k = \alpha + \beta_1 X_1^k + \beta_2 X_2^k + \ldots + \beta_N X_N^k \quad (1)$$

Figure 6:
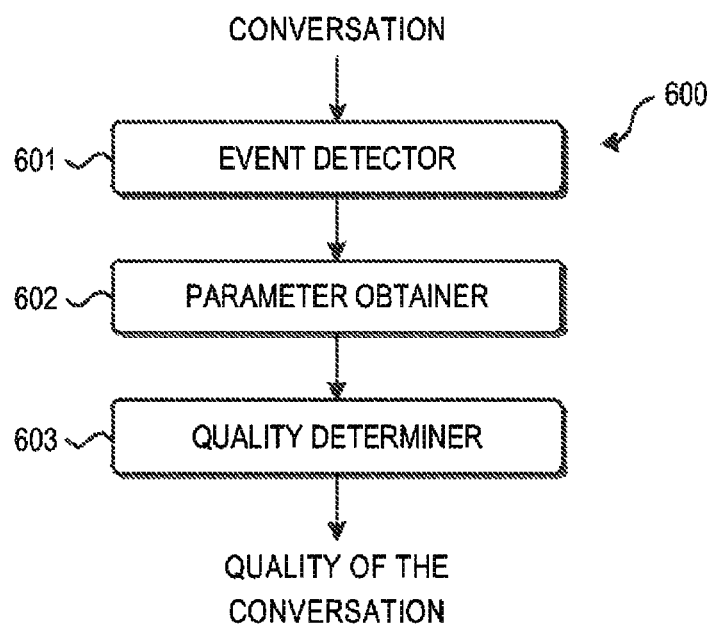
FIG. 6 illustrates a system for evaluating perceptual delay impact on a conversation in accordance with an example embodiment.

FIG. 6 illustrates a system 600 for evaluating perceptual delay impact on a conversation in accordance with an example embodiment. As shown, the system 600 includes an event detector 601 configured to detect a conversational event between a first participant and a second participant, the conversational event including a plurality of speech segments, a parameter obtainer 602 configured to obtain, in response to the conversational event being detected, a conversational parameter for the first and second participants, the conversational parameter indicating a relationship between the plurality of speech segments in the conversational event, and a quality determiner 603 configured to determine a quality of the conversation according to a model based on the conversational parameter, the model characterizing the quality with the conversational parameter.

In an example embodiment, the parameter obtainer 602 may be further configured to obtain the conversational parameter over a predefined time interval in the conversation.

In a further example embodiment, the parameter obtainer 602 further comprises a type determiner configured to determine a type of the conversational event, the type being selected from a group consisting of: a collision type where a first speech segment from the first participant is at least partially overlapped, i.e. temporally overlapped, with a second speech segment from the second participant, and a non-collision type where adjacent segments of the plurality of speech segments are separated, i.e. temporally separated, from one another, and wherein the parameter obtainer 602 may be further configured to obtain the conversational parameter based on the determined type of the conversational event.

In yet another example embodiment, the parameter obtainer 602 may further include a waiting interval parameter obtainer configured to obtain, a first conversational parameter related to a waiting interval between a third speech segment initiated from the first participant and a next fourth speech segment received by the first participant from the second participant.

In yet another example embodiment, in response to determining that the conversational event is of the non-collision type, the first conversational parameter includes at least one of the following: a total time length of the waiting interval of the conversational event and a further waiting interval of at least one further conversational event of the non-collision type within a predefined time interval, a ratio of the total time length of the waiting interval to the predefined time interval, a median of the waiting interval and the further waiting interval within the predefined time interval, percentiles of the waiting interval and the further waiting interval within the predefined time interval, a number of the conversational event and the further conversational event of the non-collision type, with the waiting interval longer than a threshold length, within the predefined time interval, a number of waiting impacts within the predefined time interval, the waiting impact being counted if in one of the conversational event and the further conversational event, one of the waiting interval and the further waiting interval is longer than the threshold length, the ratio is in a predefined range, and the speech segments are longer than corresponding threshold values, or a total number of the waiting impacts within the predefined time interval.

In one another example embodiment, the parameter obtainer 602 may further include a temporal relationship parameter obtainer configured to obtain, in response to determining that the conversational event is of the collision type, a second conversational parameter related to a temporal relationship between the first and second speech segments that are partially overlapped.

Figure 7:
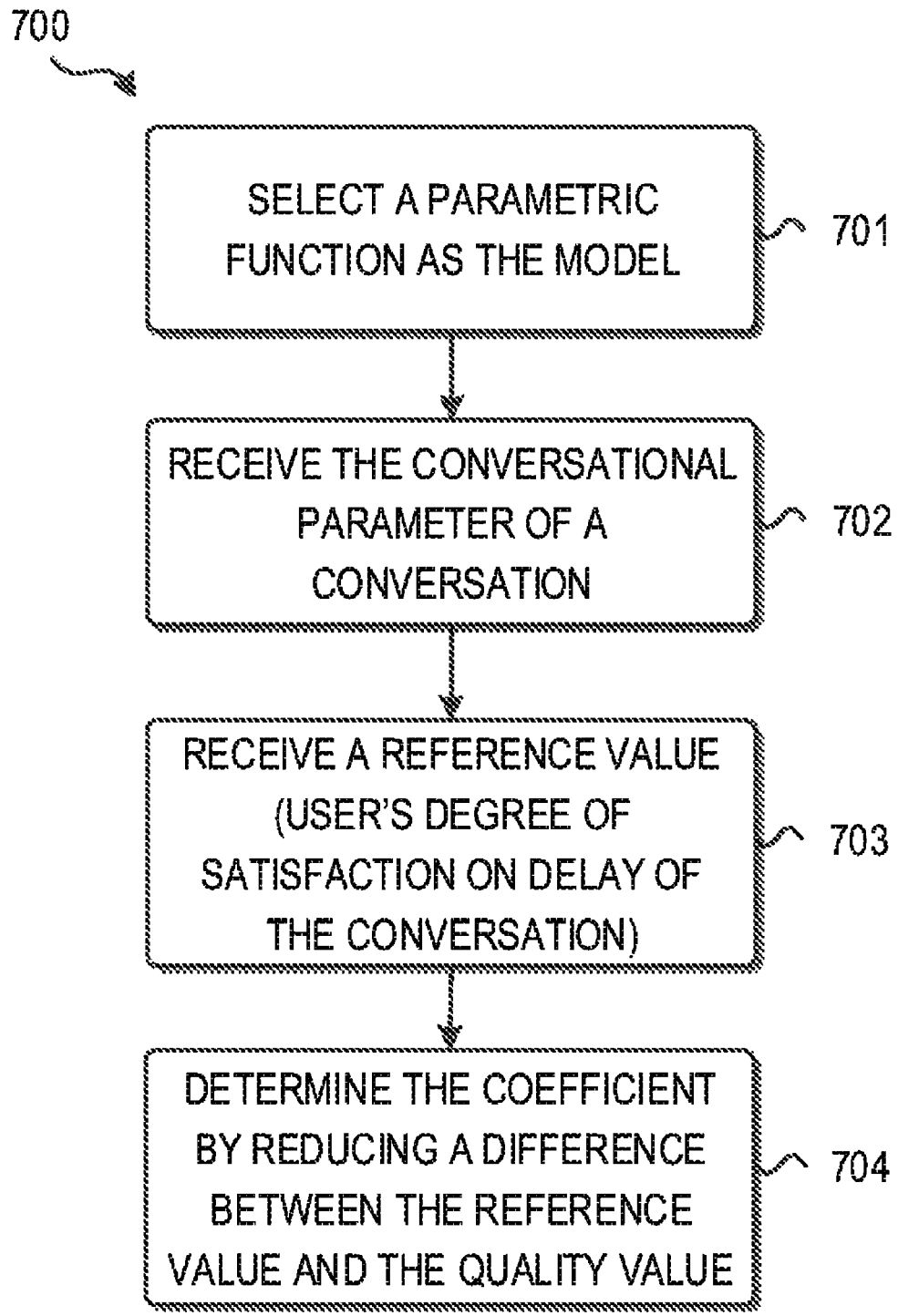
FIG. 7 illustrates a method of obtaining a model for evaluating perceptual delay impact on a conversation in accordance with an example embodiment.

FIG. 7 illustrates a method 700 of obtaining a model for evaluating perceptual delay impact on a conversation in accordance with an example embodiment. The processes to evaluate perceptual delay impact on a conversation have been described with regard to the example embodiments above. Equation (1) as described above can be considered as an example of the evaluation model.

In step 701, a parametric function is selected as the model. The parametric function can be defined by the conversational parameter and a coefficient as inputs, and a quality value $Q_{obj}$ as an output. The coefficient may be associated with the conversational parameter. The conversational parameter may include the long-wait parameter and/or the collision parameter described above. In one embodiment, the parametric function can be selected as the formulation of an objective model, and a cost function for the model training can be then defined as a sum of a squared error, which will be discussed with reference to Equation (2) below. The parametric function can be expressed as Equation (1) as above, which is a linear function with each of the conversational parameter associated with a coefficient. However, it should be understood that other forms of the parametric function can be used as well.

In step 702, the conversational parameter of a conversation is received. Because the conversational parameter describes the relationship of the speech segments, various conversations may result in different conversational parameters. In step 703, a reference value $Q_{sbj}$ indicating a user's degree of satisfaction on the delay of the conversation is received. That is, the user may evaluate the quality of the conversation based on how she/he perceives the conversation, and provides a subjective value as $Q_{sbj}$. The reference value $Q_{sbj}$ provided by the user or users can be on a scale of value "1" to "5" for example, as illustrated above. In addition, the quality value $Q_{obj}$ can also be on a scale of value "1" to "5" so that the quality perceived by the user or users is comparable with the quality determined by the parametric function.

In step 704, the coefficient is determined by reducing a difference between the quality value $Q_{obj}$ and the reference value $Q_{sbj}$ below a threshold difference or to the minimum. For example, an absolute value of a difference between the quality $Q_{obj}$ and the reference value $Q_{sbj}$ for a user k is squared, and the squared results for all K users are summed up. The values of the coefficients α and β ($β_1$ to $β_N$) for Equation (1) as described above can be determined when the summed result attains its minimum value. In other words, a cost function is defined for the model training, for example, by a sum of the square error. As a result, the parametric function is able to evaluate the perceptual delay impact on a conversation more precisely. The determination of the coefficients can be expressed as follows:

$$J = \underset{\alpha,\beta}{\operatorname{argmin}} \sum_{k=1}^{K} \|Q_{obj}^k - Q_{sbj}^k\|^2 \quad (2)$$

where J represents the adjusted coefficients resulting in a minimum difference between the quality value $Q_{obj}$ from the model (the parametric function) and the reference value $Q_{sbj}$ from the users.

The above method 700 can be carried out offline, because a recorded conversation file is in need to be evaluated by the model and by at least a user. The reference value from the user is usually regarded as the one truly reflecting the perceptual delay impact on the conversation and thus it is used as the reference. After the model is obtained, the model can be used to evaluate the quality of the conversation more similarly to the evaluation by human beings.

Figure 8:
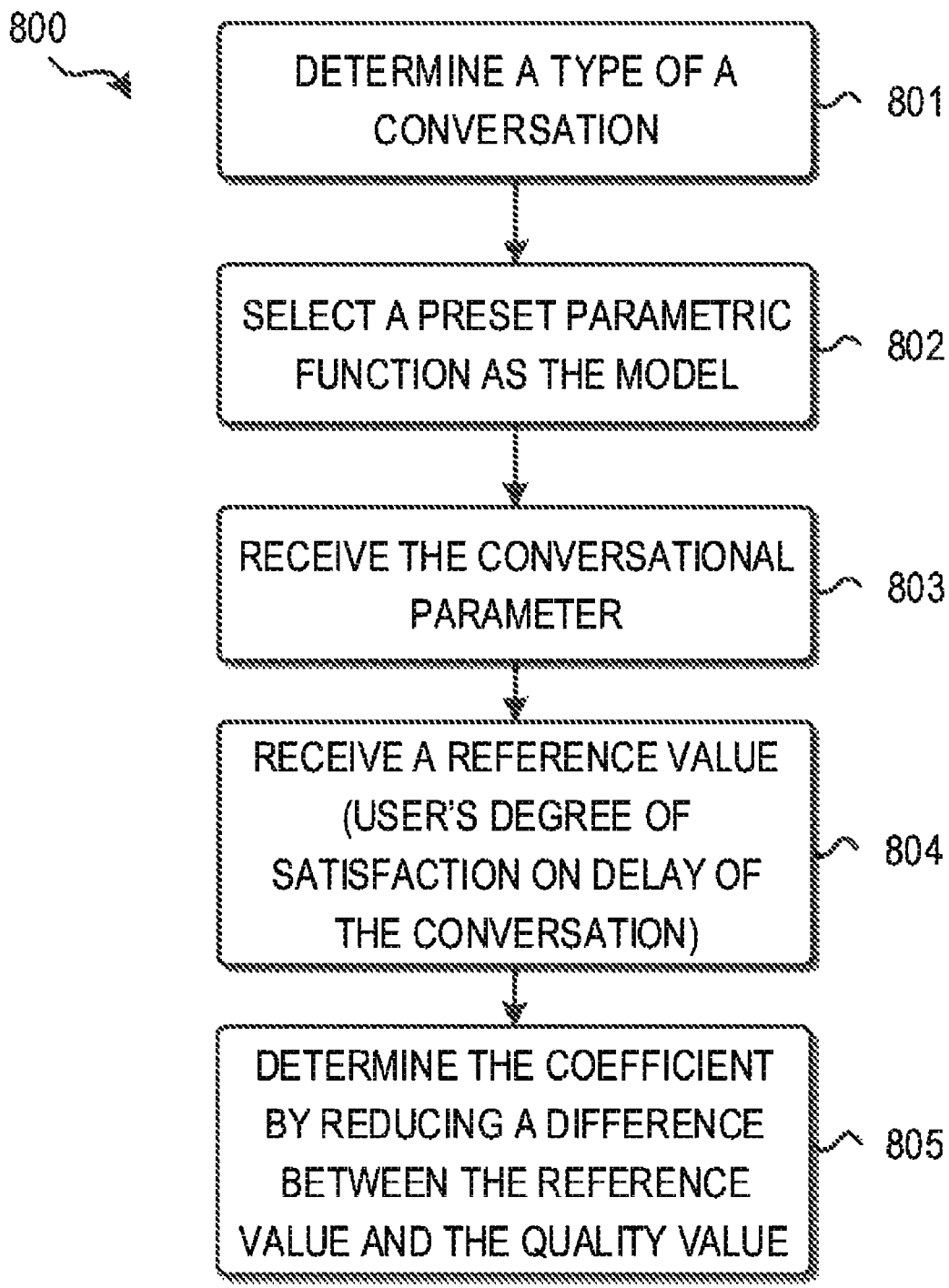
FIG. 8 illustrates a method of obtaining a model for evaluating perceptual delay impact on a conversation in accordance with another example embodiment.

FIG. 8 illustrates a method 800 of obtaining a model for evaluating perceptual delay impact on a conversation in accordance with another example embodiment. The method 800 involves determining a type for the conversation prior to the method 700. With the type determined, the parametric function can be selected to closely fit the actual conversation, thus improving the precision of the resulted objective model.

The method 800 in accordance with another example embodiment includes a step 801 in which a type for the conversation is determined, each type corresponding to preset parametric function that can be trained and saved previously. In step 802, a preset parametric function is selected as the model based on the determined type. For example, in case that the conversation is determined to belong to a debate type by analyzing patterns of the conversation, a parametric function related to the debate type can be selected. By determining the type for the conversation, the determination of the coefficients can be conducted more precisely. Steps 803 to 805 correspond to the steps 702 to 704 with reference to FIG. 7, thus detailed explanations to these steps are not to be repeated.

Figure 9:
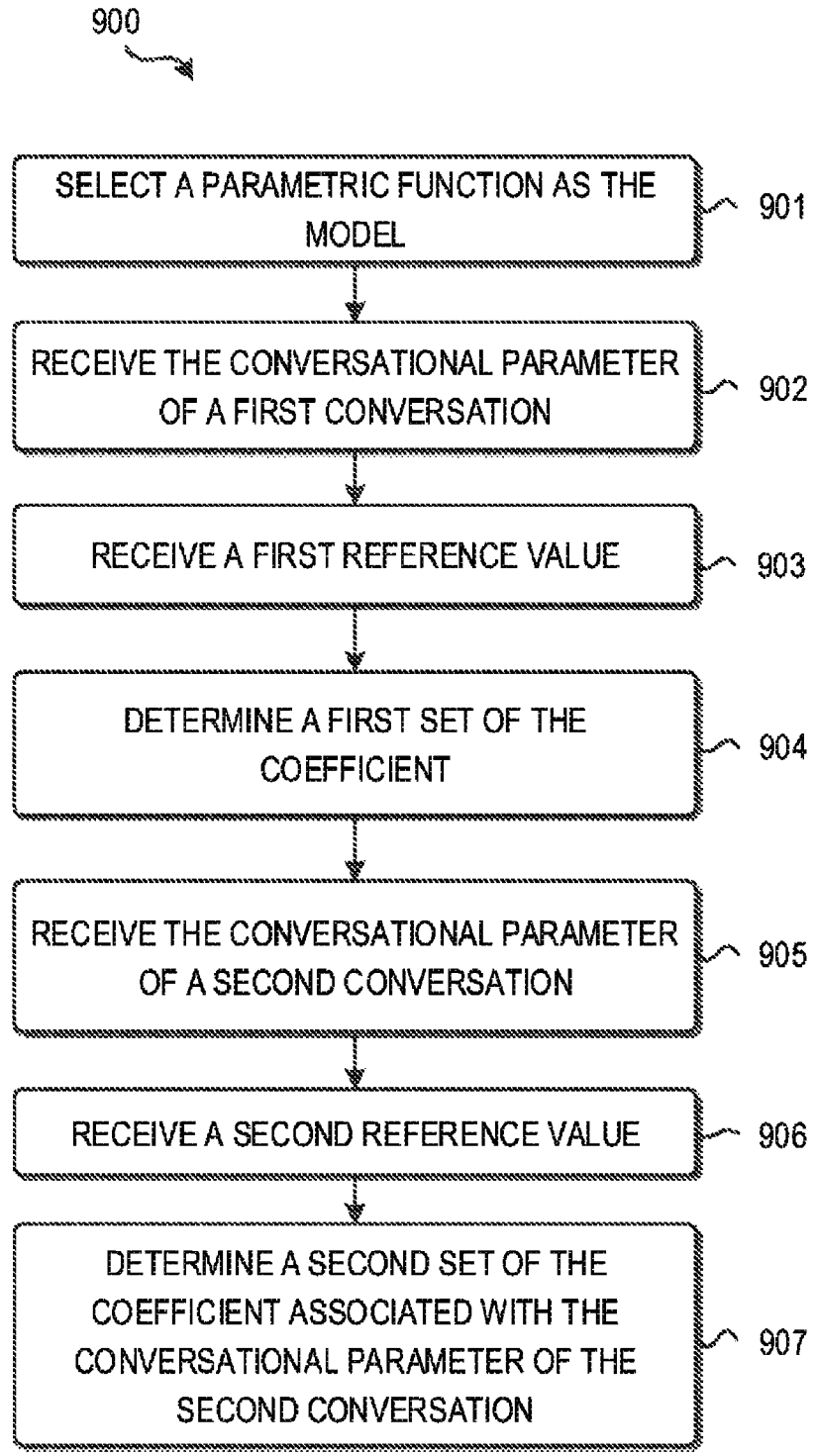
FIG. 9 illustrates a method of obtaining a model for evaluating perceptual delay impact on a conversation in accordance with a further example embodiment.

FIG. 9 illustrates a method 900 of obtaining a model for evaluating perceptual delay impact on a conversation in accordance with another example embodiment. The method 900 involves two phases of determining the coefficients for the model. A first phase may be used to determine the coefficients associated with the long-wait parameters by using a first conversation containing the conversational events that all or more than 80% of the conversational events are of the non-collision type. Then, a second phase may be used to determine the coefficients associated with the collision parameters by using a second conversation containing the conversational events of both the non-collision type and the collision type.

The method 900 in accordance with yet another example embodiment includes steps 901 to 904 which are similar to the steps 701 to 704 with reference to FIG. 7, thus detailed explanations to these steps are not to be repeated. However, as described above, the conversation, or the first conversation as used for this embodiment, includes the conversational events that all or more than 80% of the conversational events are of the non-collision type. As a result, only the coefficients associated with the long-wait parameters are to be determined in the step 904. In one example, the collision parameters may be set to zeros in the step 904.

In step 905, a second conversation including conversational events of both the long-wait type and the collision type is used to train the model. A first set of coefficients of the model associated with a first number of the conversational parameters related to the conversational events of the non-collision type (namely, the long-wait parameters) is already determined in the step 901 to 904. In step 905, the conversational parameter of the second conversation is received, as discussed previously in detail for the step 702. In step 906, a second reference value indicating a user's degree of satisfaction on the delay of the second conversation is received, as discussed previously in detail for the step 703. In step 907, by reducing a difference between the quality value and the second reference value below a threshold difference or to the minimum, as discussed previously in detail for the step 704, a second set of coefficients of the parametric function associated with a second number of the conversational parameters related to the conversational events of the collision type (namely, the collision parameters) is determined.

In summary, the method 900 uses two phases to train the model. The first phase includes the steps 901 to 904, and it uses a first conversation including conversational events that all or more than 80% of the conversational events are of the non-collision type to optimize a first set of coefficients associated with the long-wait parameters. The second phase includes steps 905 to 907, and it uses a second conversation including conversational events of both the non-collision type and collision type to optimize the second set of coefficients associated with the collision parameters. The two-phase processes may result in a more precise model used to determine the quality of the conversation, and a closer evaluation to human beings.

Figure 10:
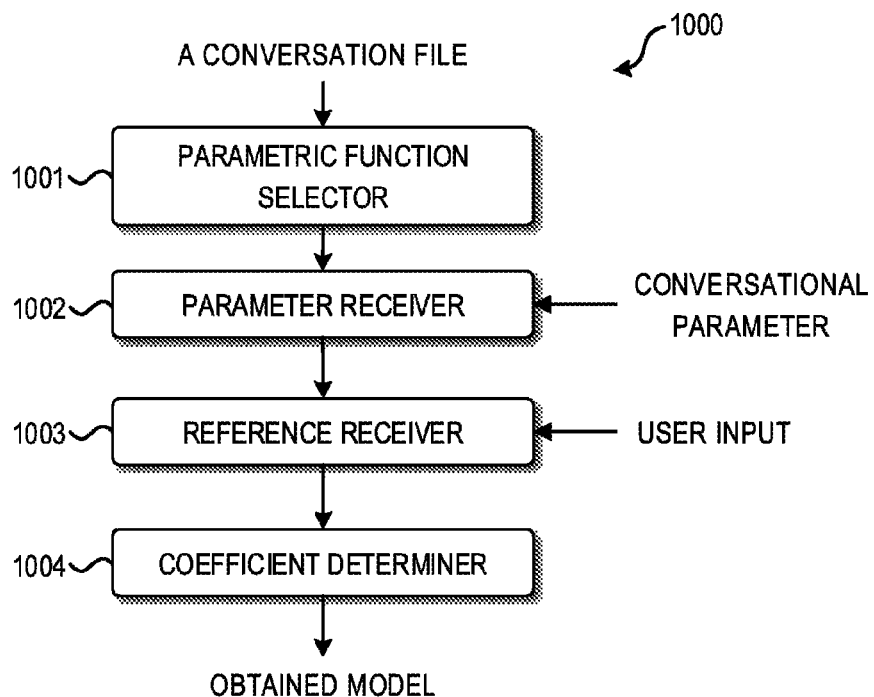
FIG. 10 illustrates a system for obtaining a model for evaluating perceptual delay impact on a conversation in accordance with an example embodiment.

FIG. 10 illustrates a system 1000 for obtaining a model for evaluating perceptual delay impact on a conversation in accordance with an example embodiment. A parametric function selector 1001 is provided to select a parametric function as the model, the parametric function being defined by the conversational parameter and a coefficient as inputs, and a quality value as an output. The coefficient initializer 1001 can be used to carry out the steps 701, 802, and 901, which are described in detail above and thus will not be repeated. A parameter receiver 1002 is provided to receiving the conversational parameter of a first conversation. The parameter receiver 1002 can be used to carry out the steps 702, 803, 902 and 905, which are described in detail above and thus will not be repeated. A reference receiver 1003 is provided to receive a first reference value indicating a user's degree of satisfaction on the delay of the first conversation. The reference receiver 1003 can be used to carry out the steps 703, 804, 903 and 906, which are described in detail above and thus will not be repeated. A coefficient determiner 1004 is provided to determine the coefficient by reducing a difference between the quality value and the first reference value below a threshold difference. The coefficient determiner 1004 can be used to carry out the steps 704, 805, 904 and 907, which are described in detail above and thus will not be repeated.

For the sake of clarity, some optional components of the system 1000 are not shown in FIG. 10. However, it should be appreciated that the features as described above with reference to FIGS. 7-9 are all applicable to the system 1000. Moreover, the components of the system 1000 may be a hardware module or a software unit module. For example, in some embodiments, the system 1000 may be implemented partially or completely with software and/or firmware, for example, implemented as a computer program product embodied in a computer readable medium. Alternatively or additionally, the system 1000 may be implemented partially or completely based on hardware, for example, as an integrated circuit (IC), an application-specific integrated circuit (ASIC), a system on chip (SOC), a field programmable gate array (FPGA), and so forth. The scope of the present disclosure is not limited in this regard. The above principles and variations are applicable to the system 600 with reference to FIG. 6 as well.

Figure 11:
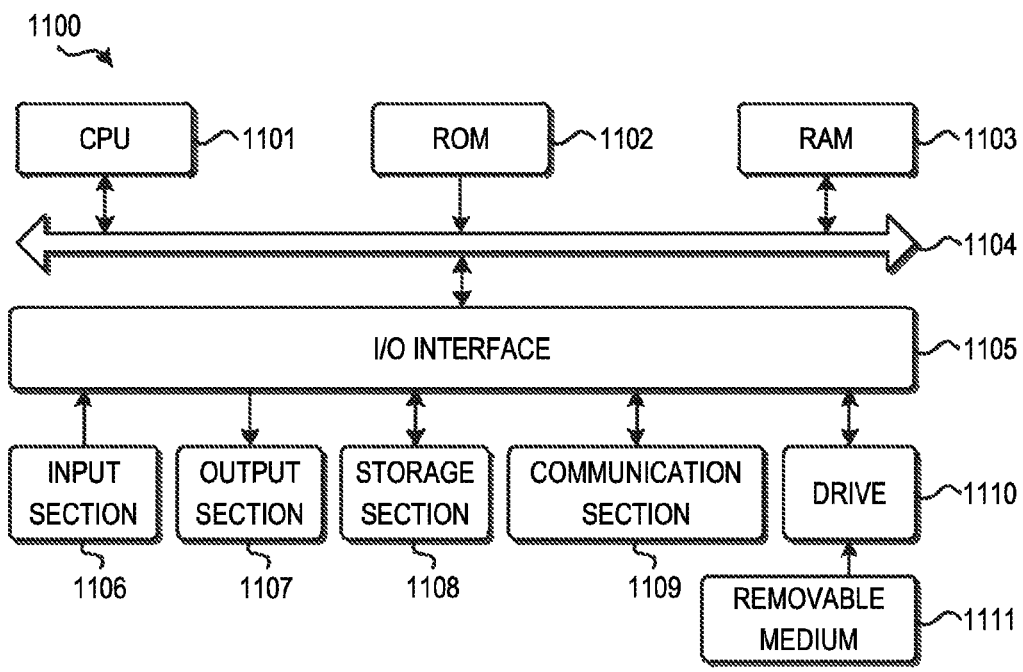
FIG. 11 illustrates a block diagram of an example computer system suitable for the implementing example embodiments disclosed herein.

FIG. 11 shows a block diagram of an example computer system 1100 suitable for implementing example embodiments disclosed herein. As shown, the computer system 1100 comprises a central processing unit (CPU) 1101 which is capable of performing various processes in accordance with a program recorded in a read only memory (ROM) 1102 or a program loaded from a storage section 1108 to a random access memory (RAM) 1103. In the RAM 1103, data required when the CPU 1101 performs the various processes or the like is also stored as required. The CPU 1101, the ROM 1102 and the RAM 1103 are connected to one another via a bus 1104. An input/output (I/O) interface 1105 is also connected to the bus 1104.

The following components are connected to the I/O interface 1105: an input section 1106 including a keyboard, a mouse, or the like; an output section 1107 including a display, such as a cathode ray tube (CRT), a liquid crystal display (LCD), or the like, and a speaker or the like; the storage section 1108 including a hard disk or the like; and a communication section 1109 including a network interface card such as a LAN card, a modem, or the like. The communication section 1109 performs a communication process via the network such as the internet. A drive 1110 is also connected to the I/O interface 1105 as required. A removable medium 1111, such as a magnetic disk, an optical disk, a magneto-optical disk, a semiconductor memory, or the like, is mounted on the drive 1110 as required, so that a computer program read therefrom is installed into the storage section 1108 as required.

Specifically, in accordance with the example embodiments disclosed herein, the processes described above with reference to FIGS. 1-3 may be implemented as computer software programs. For example, example embodiments disclosed herein comprise a computer program product including a computer program tangibly embodied on a machine readable medium, the computer program including program code for performing methods 100. In such embodiments, the computer program may be downloaded and mounted from the network via the communication section 1109, and/or installed from the removable medium 1111.

The methods described above may for example be executed by a server for teleconferencing, the server being in communication with a first client of the first participant and a second client of the second participant. Alternatively, the methods may be executed by one or more clients for teleconferencing, in particular a first client of the first participant and/or a second client of the second participant.

In the context of the present disclosure, teleconferencing may comprise audio only teleconferencing and/or video teleconferencing (also known as videoconferencing).

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed among one or more remote computers or servers.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments of this disclosure may become apparent to those skilled in the relevant arts in view of the foregoing description, when read in conjunction with the accompanying drawings. Any and all modifications will still fall within the scope of the non-limiting and example embodiments of this disclosure. Furthermore, other example embodiments set forth herein will come to mind of one skilled in the art to which these embodiments pertain to having the benefit of the teachings presented in the foregoing descriptions and the drawings.

Various aspects of the present invention may be appreciated from the following enumerated example embodiments (EEEs):

EEE 1. A method of evaluating perceptual delay impact on a conversation, comprising:
detecting a conversational event between a first participant and a second participant, the conversational event including a plurality of speech segments;
in response to the conversational event being detected, obtaining a conversational parameter for the first and second participants, the conversational parameter indicating a relationship between the plurality of speech segments in the conversational event; and
determining a quality of the conversation according to a model based on the conversational parameter, the model characterizing the quality with the conversational parameter.

EEE 2. The method according to EEE 1, wherein the obtaining a conversational parameter comprises:
obtaining the conversational parameter over a predefined time interval in the conversation.

EEE 3. The method according to EEE 1 or 2, wherein the obtaining a conversational parameter comprises:
determining a type of the conversational event, the type being selected from a group consisting of:
a collision type where a first speech segment from the first participant is at least partially overlapped with a second speech segment from the second participant, and
a non-collision type where adjacent speech segments of the plurality of speech segments are separated from one another; and
obtaining the conversational parameter based on the determined type of the conversational event.

EEE 4. The method according to EEE 3, wherein the obtaining the conversational parameter based on the determined type of the conversational event comprises:
obtaining a first conversational parameter related to a waiting interval between a third speech segment initiated from the first participant and a next fourth speech segment received by the first participant from the second participant.

EEE 5. The method of EEE 4, wherein in response to determining that the conversational event is of the non-collision type, the first conversational parameter includes at least one of the following:
a total time length of the waiting interval of the conversational event and a further waiting interval of at least one further conversational event of the non-collision type within a predefined time interval,
a ratio of the total time length of the waiting interval to the predefined time interval,
a median of the waiting interval and the further waiting interval within the predefined time interval,
percentiles of the waiting interval and the further waiting interval within the predefined time interval;
a number of the conversational event and the further conversational event of the non-collision type, with the waiting interval longer than a threshold length, within the predefined time interval,
a number of waiting impacts to the predefined time interval, the waiting impact being counted if in one of the conversational event and the further conversational event, one of the waiting interval and the further waiting interval is longer than the threshold length, the ratio is in a predefined range, and the speech segments are longer than corresponding threshold values, or
a total number of the waiting impacts within the predefined time interval.

EEE 6. The method according to any of EEEs 3 to 5, wherein the obtaining the conversational parameter based on the determined type of the conversational event comprises:
in response to determining that the conversational event is of the collision type, obtaining a second conversational parameter related to a temporal relationship between the first and second speech segments that are partially overlapped.

EEE 7. A method of obtaining a model for evaluating perceptual delay impact on a conversation based on a conversational parameter, the conversational parameter indicating a relationship between a plurality of speech segments in a conversational event of the conversation, the method comprising:
selecting a parametric function as the model, the parametric function being defined by the conversational parameter and a coefficient as inputs, and a quality value as an output;
receiving the conversational parameter of a first conversation;
receiving a first reference value indicating a user's degree of satisfaction on the delay of the first conversation; and
determining the coefficient by reducing a difference between the quality value and the first reference value below a threshold difference.

EEE 8. The method according to EEE 7, wherein the selecting the parametric function comprises:
determining a type for the conversation, the type corresponding to a preset parametric function; and
selecting a preset parametric function as the model based on the determined type.

EEE 9. The method according to EEE 7 or 8, wherein the first conversation including a plurality of conversational events of a non-collision type where adjacent speech segments of the plurality of speech segments are separated from one another, the method further comprising:
receiving the conversational parameter of a second conversation including both the conversational events of the non-collision type, and of a collision type where a first speech segment from the first participant is at least partially overlapped with a second speech segment from the second participant;

receiving a second reference value indicating a user's degree of satisfaction on the delay of the second conversation; and determining the coefficient associated with the conversational parameter of the second conversation by reducing a difference between the quality value and the second reference value below a threshold difference.

EEE 10. A system for evaluating perceptual delay impact on a conversation, comprising:

an event detector configured to detect a conversational event between a first participant and a second participant, the conversational event including a plurality of speech segments;

a parameter obtainer configured to obtain, in response to the conversational event being detected, a conversational parameter for the first and second participants, the conversational parameter indicating a relationship between the plurality of speech segments in the conversational event; and a quality determiner configured to determine a quality of the conversation according to a model based on the conversational parameter, the model characterizing the quality with the conversational parameter.

EEE 11. The system according to EEE 10, wherein the parameter obtainer is further configured to obtain the conversational parameter over a predefined time interval in the conversation.

EEE 12. The system according to EEE 10 or 11, wherein the parameter obtainer further comprises a type determiner configured to determine a type of the conversational event, the type being selected from a group consisting of:

a collision type where a first speech segment from the first participant is at least partially overlapped with a second speech segment from the second participant, and a non-collision type where adjacent speech segments of the plurality of speech segments are separated from one another, and wherein the parameter obtainer is further configured to obtain the conversational parameter based on the determined type of the conversational event.

EEE 13. The system according to EEE 12, wherein the parameter obtainer further comprises a waiting interval parameter obtainer configured to obtain a first conversational parameter related to a waiting interval between a third speech segment initiated from the first participant and a next fourth speech segment received by the first participant from the second participant.

EEE 14. The system according to EEE 13, in response to determining that the conversational event is of the non-collision type, the first conversational parameter includes at least one of the following:

a total time length of the waiting interval of the conversational event and a further waiting interval of at least one further conversational event of the non-collision type within a predefined time interval, a ratio of the total time length of the waiting interval to the predefined time interval, a median of the waiting interval and the further waiting interval within the predefined time interval, percentiles of the waiting interval and the further waiting interval within the predefined time interval, a number of the conversational event and the further conversational event of the non-collision type, with the waiting interval longer than a threshold length, within the predefined time interval, a number of waiting impacts within the predefined time interval, the waiting impact being counted if in one of the conversational event and the further conversational event, one of the waiting interval and the further waiting interval is longer than the threshold length, the ratio is in a predefined range, and the speech segments are longer than corresponding threshold values, or a total number of the waiting impacts within the predefined time interval.

EEE 15. The system according to any of EEEs 12 to 14, wherein the parameter obtainer further comprises a temporal relationship parameter obtainer configured to obtain, in response to determining that the conversational event is of the collision type, a second conversational parameter related to a temporal relationship between the first and second speech segments that are partially overlapped.

EEE 16. A system for obtaining a model for evaluating perceptual delay impact on a conversation based on a conversational parameter, the conversational parameter indicating a relationship between a plurality of speech segments in a conversational event of the conversation, the system comprising:

a parametric function selector configured to select a parametric function as the model, the parametric function being defined by the conversational parameter and a coefficient as inputs, and a quality value as an output;

a parameter receiver configured to receiving the conversational parameter of a first conversation;

a reference receiver configured to receive a first reference value indicating a user's degree of satisfaction on the delay of the first conversation; and a coefficient determiner configured to determine the coefficient by reducing a difference between the quality value and the first reference value below a threshold difference.

EEE 17. The system according to EEE 16, wherein the parametric function selector further comprises:

a type determiner configured to determine a type for the conversation, the type corresponding to a preset parametric function, and wherein the parametric function selector is further configured to select a preset parametric function as the model based on the determined type.

EEE 18. The system according to EEE 16 or 17, wherein the first conversation including a plurality of conversational events of a non-collision type where adjacent speech segments of the plurality of speech segments are separated from one another, the parameter receiver being configured to receive the conversational parameter of a second conversation including both the conversational events of the non-collision type, and of a collision type where a first speech segment from the first participant is at least partially overlapped with a second speech segment from the second participant, the reference receiver being configured to receive a second reference value indicating a user's degree of satisfaction on the delay of the second conversation, and the coefficient determiner being configured to determine the coefficient associated with the conversational parameter of the second conversation by reducing a difference between the quality value and the second reference value below a threshold difference.

EEE 19. A computer program product for evaluating perceptual delay impact on a conversation, the computer program product being tangibly stored on a non-transient computer-readable medium and comprising machine executable instructions which, when executed, cause the machine to perform steps of the method according to any of EEEs 1 to 6.

EEE 20. A computer program product for obtaining a model for evaluating perceptual delay impact on a conversation, the computer program product being tangibly stored on a non-transient computer-readable medium and comprising machine executable instructions which, when executed, cause the machine to perform steps of the method according to any of EEEs 7 to 9.

The invention claimed is:

1. A method of evaluating perceptual delay impact on a teleconferencing conversation, comprising:
    detecting a conversational event between a first participant and a second participant, the conversational event including a plurality of speech segments;
    in response to the conversational event being detected, obtaining at least one conversational parameter for the first and second participants, the at least one conversational parameter indicating a relationship between the plurality of speech segments in the conversational event; and
    determining a quality of the conversation according to a model based on the at least one conversational parameter, the model characterizing the quality with the at least one conversational parameter, wherein the obtaining the at least one conversational parameter comprises:
    determining a type of the conversational event, the type being selected from a group consisting of:
        a collision type where a first speech segment from the first participant is at least partially overlapped with a second speech segment from the second participant, and
        a non-collision type where adjacent speech segments of the plurality of speech segments are separated from one another; and
    obtaining the at least one conversational parameter based on the determined type of the conversational event, comprising, in response to determining that the conversational event is of the non-collision type, obtaining a first conversational parameter related to a waiting interval between a third speech segment initiated from the first participant and a next fourth speech segment received by the first participant from the second participant.

2. The method of claim 1, wherein the first conversational parameter includes at least one of the following:
    a total time length of the waiting interval of the conversational event and a further waiting interval of at least one further conversational event of the non-collision type within a predefined time interval,
    a ratio of the total time length of the waiting interval to the predefined time interval,
    a median of the waiting interval and the further waiting interval within the predefined time interval,
    percentiles of the waiting interval and the further waiting interval within the predefined time interval;
    a number of the conversational event and the further conversational event of the non-collision type, with the waiting interval longer than a threshold length, within the predefined time interval,
    a number of waiting impacts within the predefined time interval, the waiting impact being counted if, in one of the conversational event and the further conversational event, the waiting interval respectively the further waiting interval is longer than the threshold length, the ratio of a response interval to the waiting interval respectively the further waiting interval is in a predefined range, and the speech segments are longer than corresponding threshold values, or
    a total number of the waiting impacts within the predefined time interval.

3. The method according to claim 1, wherein the obtaining the at least one conversational parameter based on the determined type of the conversational event comprises:
    in response to determining that the conversational event is of the collision type, obtaining a second conversational parameter related to a temporal relationship between the first and second speech segments that are partially overlapped.

4. The method according to claim 1, wherein the obtaining the at least one conversational parameter comprises:
    obtaining the at least one conversational parameter over a predefined time interval in the conversation.

5. A method of obtaining a model for evaluating perceptual delay impact on a teleconferencing conversation based on at least one conversational parameter, the at least one conversational parameter indicating a relationship between a plurality of speech segments in a conversational event between a first participant and a second participant of the conversation, the method comprising:
    selecting a parametric function as the model, the parametric function being defined by the at least one conversational parameter and a coefficient as inputs, and a quality value as an output;
    receiving a first conversational parameter of a first conversation;
    receiving a first reference value indicating a user's degree of satisfaction on the delay of the first conversation; and
    determining the coefficient by reducing a difference between the quality value and the first reference value below a threshold difference,
    wherein the first conversation includes at least one conversational event of a non-collision type where adjacent speech segments of the plurality of speech segments are separated from one another, and the first conversational parameter is related to a waiting interval between a speech segment initiated from the first participant and a next speech segment received by the first participant from the second participant.

6. The method according to claim 5, wherein the selecting the parametric function comprises:
    determining a type for the conversation, the type corresponding to a preset parametric function; and
    selecting a preset parametric function as the model based on the determined type.

7. The method according to claim 5, the method further comprising:
    receiving a second conversational parameter of a second conversation including conversational events of both the non-collision type, and of a collision type where a first speech segment from the first participant is at least partially overlapped with a second speech segment from the second participant;
    receiving a second reference value indicating a user's degree of satisfaction on the delay of the second conversation; and
    determining the coefficient associated with the second conversational parameter of the second conversation by reducing a difference between the quality value and the second reference value below a threshold difference.

8. A system for evaluating perceptual delay impact on a teleconferencing conversation, comprising:
- an event detector configured to detect a conversational event between a first participant and a second participant, the conversational event including a plurality of speech segments;
- a parameter obtainer configured to obtain, in response to the conversational event being detected, at least one conversational parameter for the first and second participants, the at least one conversational parameter indicating a relationship between the plurality of speech segments in the conversational event; and
- a quality determiner configured to determine a quality of the conversation according to a model based on the at least one conversational parameter, the model characterizing the quality with the at least one conversational parameter, wherein the parameter obtainer further comprises a type determiner configured to determine a type of the conversational event, the type being selected from a group consisting of:
  - a collision type where a first speech segment from the first participant is at least partially overlapped with a second speech segment from the second participant, and
  - a non-collision type where adjacent speech segments of the plurality of speech segments are separated from one another, and wherein
- the parameter obtainer is further configured to obtain the at least one conversational parameter based on the determined type of the conversational event, wherein the parameter obtainer further comprises a waiting interval parameter obtainer configured to, in response to the type determiner determining that the conversational event is of the non-collision type, obtain a first conversational parameter related to a waiting interval between a third speech segment initiated from the first participant and a next fourth speech segment received by the first participant from the second participant.

9. The system according to claim 8, wherein the first conversational parameter includes at least one of the following:
- a total time length of the waiting interval of the conversational event and a further waiting interval of at least one further conversational event of the non-collision type within a predefined time interval,
- a ratio of the total time length of the waiting interval to the predefined time interval,
- a median of the waiting interval and the further waiting interval within the predefined time interval,
- percentiles of the waiting interval and the further waiting interval within the predefined time interval,
- a number of the conversational event and the further conversational event of the non-collision type, with the waiting interval longer than a threshold length, within the predefined time interval,
- a number of waiting impacts within the predefined time interval, the waiting impact being counted if, in one of the conversational event and the further conversational event, the waiting interval respectively the further waiting interval is longer than the threshold length, the ratio of a response interval to the waiting interval respectively the further waiting interval is in a predefined range, and the speech segments are longer than corresponding threshold values, or
- a total number of the waiting impacts within the predefined time interval.

10. The system according to claim 8, wherein the parameter obtainer further comprises a temporal relationship parameter obtainer configured to obtain, in response to determining that the conversational event is of the collision type, a second conversational parameter related to a temporal relationship between the first and second speech segments that are partially overlapped.

11. The system according to claim 8, wherein the parameter obtainer is further configured to obtain the at least one conversational parameter over a predefined time interval in the conversation.

12. A system for obtaining a model for evaluating perceptual delay impact on a teleconferencing conversation based on at least one conversational parameter, the at least one conversational parameter indicating a relationship between a plurality of speech segments in a conversational event between a first participant and a second participant of the conversation, the system comprising:
- a parametric function selector configured to select a parametric function as the model, the parametric function being defined by the at least one conversational parameter and a coefficient as inputs, and a quality value as an output;
- a parameter receiver configured to receiving a first conversational parameter of a first conversation;
- a reference receiver configured to receive a first reference value indicating a user's degree of satisfaction on the delay of the first conversation; and
- a coefficient determiner configured to determine the coefficient by reducing a difference between the quality value and the first reference value below a threshold difference,
- wherein the first conversation includes at least one conversational event of a non-collision type where adjacent speech segments of the plurality of speech segments are separated from one another, and the first conversational parameter is related to a waiting interval between a speech segment initiated from the first participant and a next speech segment received by the first participant from the second participant.

13. The system according to claim 12, wherein the parametric function selector further comprises:
- a type determiner configured to determine a type for the conversation, the type corresponding to a preset parametric function, and wherein
- the parametric function selector is further configured to select a preset parametric function as the model based on the determined type.

14. The system according to claim 12, wherein the parameter receiver is configured to receive a second conversational parameter of a second conversation including conversational events of both the non-collision type, and of a collision type where a first speech segment from the first participant is at least partially overlapped with a second speech segment from the second participant,
- the reference receiver being configured to receive a second reference value indicating a user's degree of satisfaction on the delay of the second conversation, and
- the coefficient determiner being configured to determine the coefficient associated with the second conversational parameter of the second conversation by reducing a difference between the quality value and the second reference value below a threshold difference.

15. A non-transitory computer-readable storage medium having stored thereon computer-executable instruction which, when executed by a computing device or system, cause said computing device or system to perform the method according to claim 1.

* * * * *